United States Patent [19]

Mueller

[11] 3,807,547

[45] Apr. 30, 1974

[54] CONVEYING ARRANGEMENT FOR PAPER SHEETS AND SIMILAR OBJECTS

[75] Inventor: Hans Mueller, Zofingen, Switzerland

[73] Assignee: Grapha Maschinenfabrik Hans Mueller AG, Zofingen, Switzerland

[22] Filed: July 18, 1972

[21] Appl. No.: 272,934

[30] Foreign Application Priority Data
July 19, 1971   Switzerland .................... 10556/71

[52] U.S. Cl. ............................. 198/131, 198/170
[51] Int. Cl. ........................................... B65g 17/00
[58] Field of Search .......... 198/131, 170, 171, 172, 198/173

[56] References Cited
UNITED STATES PATENTS

| | | | |
|---|---|---|---|
| 1,601,802 | 10/1926 | Kast | 198/170 |
| 2,941,679 | 6/1960 | Miller | 198/170 |
| 3,447,696 | 6/1969 | Calistrat | 198/170 |
| 2,780,342 | 2/1957 | Good | 198/170 |
| 1,593,501 | 7/1926 | Martin et al. | 198/170 |
| 2,623,746 | 12/1952 | Gegenheimer et al. | 198/170 |

Primary Examiner—Evon C. Blunk
Assistant Examiner—Joseph E. Valenza
Attorney, Agent, or Firm—Michael S. Striker

[57] ABSTRACT

A pair of endless parallel conveying chains have respective upper horizontal runs on which paper sheets are to be conveyed towards a discharge location. Engaging elements are provided equi-distantly spaced on the chains and are each mounted for pivotal displacement between two end positions in one of which they extend into and in the other of which they are retracted out of the path of movement of objects on the runs. Appropriate guides effect pivoting of the engaging elements to the other position in which they are retracted out of the path of movement of objects, when the engaging elements arrive at the discharge location.

6 Claims, 2 Drawing Figures

CONVEYING ARRANGEMENT FOR PAPER SHEETS AND SIMILAR OBJECTS

BACKGROUND OF THE INVENTION

The present invention relates generally to a conveying arrangement and more particularly to a conveying arrangement for papers sheets and similar objects. Still more particularly the invention relates to a conveying arrangement for use in the paper-working industry.

It is already known to use in the paper-working industry conveying arrangements for sheets or thin stacks of sheets of paper. These arrangements utilize conveyor chains, and in particular two parallel endless conveyor chains which each advance in a vertical plane and have an upper and a lower horizontal run. Each chain is composed of chain links which are inclined towards one another, that is the links of one chain are inclined towards the other and vice versa, in order to form an essentially roof-shaped support for the paper sheets. The chains are spaced from one another to such an extent that along the center region between the two chains there exists a slot. Folded sheets of paper are placed over the two parallel chains at one or several charging locations, and they abut against pairs of engaging elements which extend laterally outwardly from the respective chains and are distributed evenly over the entire length of the chains. These pairs of engaging elements are fast with the chains and serve to carry the paper sheets from the respective charging location to a discharge location where the sheets leave the conveying arrangement, for further processing.

The removal of the sheets at the discharge location is effected by providing above the discharge location several rotating pairs of rollers of another conveying arrangement which conveys in direction transversely to the direction of the first conveying arrangement. Beneath the discharge location and between the chains, the conveying arrangement is provided with a device which can be raised and lowered, so that it can lift the folded sheets off the chains and push them between the pairs of rollers which then engage them. For this purpose the pairs of rollers must be close enough to the conveying arrangement so that even at high operating speed of the conveying arrangement the lifting device can be raised and lowered in a complete cycle before the next-following folded sheet of paper arrives at the discharge location.

This has the disadvantage that the folded sheet contacts the pair of engaging elements which are in engagement with it, even while it is already being pushed between a pair of rollers for engagement by the same. This means that these rollers must have in the direction of advancement of the chains a component of movement which has approximately the same speed as the conveying arrangement. The problem here is that the folded sheet must be removed transversely to the direction of advancement of the conveying arrangement itself, so that the second conveying arrangement which effects such transverse removal must operate at a substantially higher conveying speed than the first arrangements The result is that the momentary acceleration during transfer of a respective paper sheet to the pairs of engaging rollers may cause damage to the paper sheet.

This problem has already been realized and the art has, in fact, attempted to overcome it. In particular it has been suggested in the prior art to spread the folded sheet of paper far enough apart —prior to its engagement by the engaging rollers and by the aid of auxiliary devices which cooperate and act simultaneously with the device which transfers the sheet from the conveying arrangement to these rollers— to such an extent that the two folded portions of the folded sheet are moved out of the path of the pair of engaging elements which has been pushing the sheet along on the conveying arrangement. With such a construction this pair of engaging elements can move beneath the folded sheet of paper without contacting and damaging it, and the operational speed of the second conveying arrangement acting transversely to the first conveying arrangement, could be accommodated to the operational speed of the first arrangement and did not have to be higher. However, problems here were encountered in the case of paper sheets of relatively thick paper, for instance folded magazines or the like (it should be understood that the reference to "paper sheets" is intended to refer in all instances to single sheets or to stacks of such sheets). Because of the substantial spreading effected by the auxiliary devices the outermost portions of these sheets or stacks of sheets were frequently torn by the engaging rollers. Furthermore, the use of the auxiliary devices required that the mass to be moved during each transfer of papers sheets to the engaging rollers, was great so that the construction of the arrangement had to be more complicated and therefore more expensive.

It is clear, therefore, that the state of the art as heretofore known calls for further improvement.

SUMMARY OF THE INVENTION

Accordingly, it is a general object of the present invention to provide an improved conveying arrangement for paper sheets and similar objects, which provides such further improvements.

An additional object of the invention is to provide such a conveying arrangement which permits an increase in the operational speed of the arrangement, independently of the thickness of the papers sheets or similar objects and without requiring any significant structural expenditures.

Another object of the invention is to provide such a conveying arrangement which is reliable in its operation.

In pursuance of these objects, and of others which will become apparent hereafter, one feature of the invention resides, in a conveying arrangement for paper sheets and similar objects, in a combination which briefly stated comprises a pair of endless parallel conveying chains having respective upper substantially horizontal runs on which objects are conveyed in direction towards a discharge location. A plurality of engaging elements are provided on the respective chains and are each mounted for pivotal displacement between a first and a second position in which it respectively extends into and is retracted out of the path of movement of objects on the upper runs. Means is provided for effecting pivoting of the respective engaging elements from the first to the second end position in response to arrival of the engaging elements at the discharge location.

The arrangement according to the present invention avoids the disadvantages of the prior art, as will already be understood and become still clearer from a consideration of the drawing and the description thereof which are to follow. In addition the conveying arrangement to the present invention is such that already existing conveying arrangements of similar type can readily be modified in accordance with the invention, with little expense and difficulty, so that they can achieve higher operating speeds.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
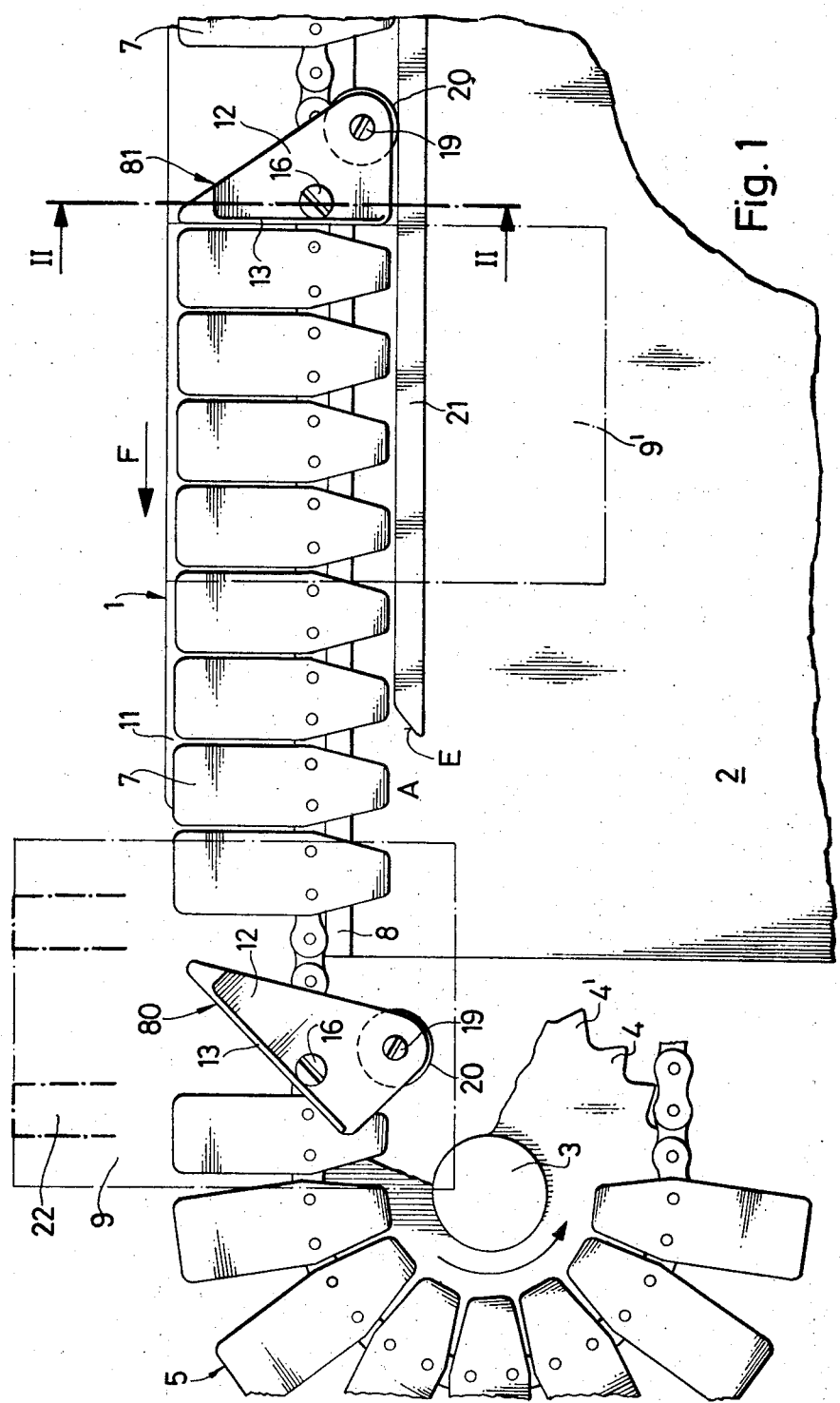
FIG. 1 is a fragmentary side-elevational view illustrating an embodiment of the invention.
Figure 2:
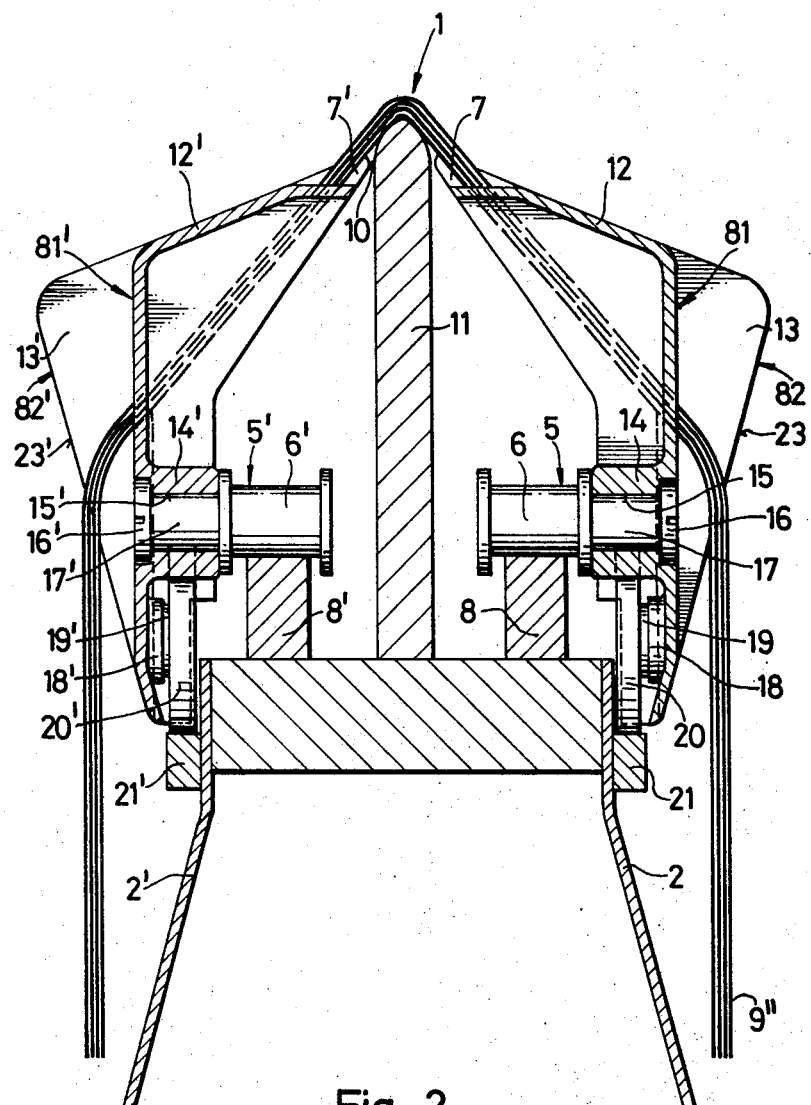
FIG. 2 is a section taken on line II—II of FIG. 1.

Discussing now the drawing in detail it will be seen that FIGS. 1 and 2 show a fragment of a conveying arrangement. The non-illustrated portion of the arrangement is not believed necessary because the invention can be readily understood from the portion which has been shown.

A support 2 of the conveying arrangement has journalled in it a driven shaft 3 on which there are mounted, rotatable with but not relative to the shaft 3, two chain reversing wheels 4 and 4' which are spaced axially of the shaft 3. A similar shaft corresponding to the shaft 3 is provided at the other, non-illustrated end of the support 2 but is journalled freely rotatably, rather than being driven. It is provided with two additional wheels corresponding to the wheels 4 and 4'.

Two endless chains 5 and 5' are provided, being transversely spaced and being each trained about one of the wheels 4 and 4' which are illustrated, and, at the non-illustrated end of the support 2, about a corresponding wheel. As the drawing shows, each of the chains 5 and 5' is composed of an endless series of roller links 6, 6' and elements 7 and 7' which are fastened thereto. In addition, there is provided a series of engaging elements 80, 81, 81', 82, 82'.

Each of the chains 5, 5' has an upper run and a lower run, and the upper run which is substantially horizontal or completely horizontal, is intended to support objects to be conveyed.

Extending along the upper run of the chains 5 and 5' are two horizontal guide rails 8 and 8' provided on the support 2 and supporting the series of chain links 6, 6'. The upper or outer ends of the members 7 and 7' are angled towards one another as illustrated and define a roof-shaped surface for supporting the folded sheets (single sheets or stacks of sheets) 9', 9" which are placed onto the chains 5, 5' straddling the same. A slot 10 is left between the angled ends of the members 7 and 7' and a rib or similar member 11 extends into and through this slot and constitutes the upper support for the roof-shaped engagement of the sheets.

The construction and mounting of the engaging elements 80, 81, 81', 82 and 82' will be discussed with respect to the engaging elements 81 and 82 which are shown in FIGS. 1 and 2. It should be understood that all of the engaging elements are of identical configuration and identically mounted on the chains 5 and 5', respectively. The discussion of the elements 81 and 82 in detail will therefore suffice for an understanding and the other elements 80, 81' and 82' are simply identified with reference numerals. Element 81' is a body of one piece provided with a wall 12 which is of triangular configuration and which is inwardly angled. The direction of conveying by the arrangement according to the present invention is designated by the arrow F, and that end of the wall 12 which faces forwardly in the direction F extends at right angles in outward direction to form an engaging portion 13. The portion 13 of the engaging element 82 which follows the engaging element 81 in upstream direction (that is opposite the direction F) is visible in FIG. 2, and it will be seen that the sheet 9" abuts against the engaging element 82.

The wall 12 in each case is provided on its inner side with a journal 14 with a slide bearing surface 15. A screw 16 with a cylindrical shaft 71 is fixed with the chain 5 and serves as the pivot axis for the engaging element 81. A second journal 18 has secured therein a shaft 19 on which there is mounted freely turnably a roller 20 which is supported from below and rolls on the guide rail 21 mounted on the support 2. It will be noted that the rails 21 extend from the charging locations where the sheets 9', 9" are placed onto the chains, to the discharge location A where the sheets are removed. A second rail 21' extends transversely spaced and along the rail 21, and cooperates with a second roller 20' which is mounted on a shaft 19' corresponding to the shaft 19. In fact, all components of the chain 5' correspond to the components of the chain 5, being identified with similar reference numerals which are provided with a prime symbol.

As the chains 5, 5' advance in the direction of the arrow F, the rollers 20, 20' will move off the guide rails 21, 21' at the location E (see FIG. 1) that is as soon as the sheets 9', 9" reach the discharge location A. The weight of the rollers 20, 20' and of those portions of the engaging elements 80, 81, 81', 82, 82' which are located above the pivot axis 17, causes the engaging elements to be rearwardly and downwardly pivoted about the pivot axis 17 as soon as the rollers 20, 20' move off the rails 21, 21' at the location E. In other words, the engaging elements are thus retracted from their position in which they extend into the path of movement of the paper sheets or similar objects, to another end position in which they are retracted from this path.

Element 22 diagrammatically shows the component which lifts the sheets 9, 9', 9" off the conveying arrangement 1. The lifting of the sheets causes them to be retarded in a direction opposite to the direction of advancement F, so that the associated engaging element (here the engaging element 80) moves beneath the respective sheet (here the sheet 9). The resistance of the sheet 9 causes the element 80 further to be displaced downwardly and rearwardly out of the path of movement of the sheet 9 so that the sheet cannot be damaged.

FIG. 2 shows that the portions 13, 13' are each provided with a downwardly conically tapering edge region 23, 23' which at the lower end is flush with the elements 7, 7' adjacent toward it. The downward pivoting of the engaging elements 80, 81, 81', 82, 82' causes the edge region 23, 23' to form a wedge which readily opens the respective sheets as it passes beneath them.

This assures that even if the sheets are relatively strongly retarded in their movement, they cannot be damaged by the engaging elements moving underneath them.

It is clear that the present invention overcomes the disadvantages which have been outlined above with respect to the prior art. It is further clear that the present invention can be incorporated with little difficulty in existing analogous conveying arrangements which can thus be modified to operate at higher production speed and at less —if any— trouble than was heretofore possible.

It will be understood that each of the elements described above, or two or more together, may also find a useful application in other types of constructions differing from the types described above.

While the invention has been illustrated and described as embodied in a conveying arrangement for paper sheets and similar objects, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by letters Patent is set forth in the appended claims:

1. In a conveying arrangement for paper sheets and similar objects, a combination comprising a pair of endless parallel conveying chains having respective upper substantially horizontal runs and means which define a support surface supporting paper sheets in inverted V-shaped position which are supported and conveyed thereon in direction towards a discharge location; a plurality of engaging elements provided on the respective chains movable therewith and at equal spacing therealong, said engaging elements each having a wedge-shaped plate section provided with a lower portion and with an upper portion and with a side edge which diverges from said lower portion transversely of and outwardly from the respective chain towards said upper portion; mounting means mounting each of said engaging elements for pivotal displacement about a pivot axis extending transversely to said direction, between a first position in which the associated wedge-shaped plate section is substantially vertically oriented and extends into the path of movement of said objects so as to abut against a conveyed paper sheet or similar object and thus prevent sliding of the same relative to said support surface, and a second position in which it is inclined opposite to said direction to include with said direction an acute angle so as to permit sliding of said conveyed paper sheet or similar object relative to said support surface; and actuating means for pivoting the respective engaging elements from said first to said second position when said engaging elements arrive at said discharge location so that said sections can slide beneath said objects.

2. A combination as defined in claim 1; further comprising mounting means mounting said engaging elements for said pivotal displacement and including a shaft extending transversely of said upper runs and defining said pivot axis for pivoting of said engaging elements; a pair of rollers turnable about an axis extending transversely of said upper runs at a level below said shaft and upstream of the same and of said discharge location, said rollers each being in supporting engagement with one of said upper runs; and a pair of guide rails extending longitudinally of said upper runs below the same and each in supporting engagement with and beneath one of said rollers.

3. A combination as defined in claim 2, said engaging elements each having one part and an other part which in said first position are respectively located higher and lower than said pivot axis.

4. A combination as defined in claim 3, wherein said one part has a weight greater than said other part.

5. A combination as defined in claim 1, said chains each comprising a plurality of roller links.

6. A combination as defined in claim 1; and further comprising reversing roller means engaging said chains in the region of said discharge location for reversing the chains from said upper to a lower run.

* * * * *